United States Patent
Falodiya

(10) Patent No.: US 10,382,426 B2
(45) Date of Patent: Aug. 13, 2019

(54) AUTHENTICATION CONTEXT TRANSFER FOR ACCESSING COMPUTING RESOURCES VIA SINGLE SIGN-ON WITH SINGLE USE ACCESS TOKENS

(71) Applicant: Adobe Inc., San Jose, CA (US)

(72) Inventor: Aditya Falodiya, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 26 days.

(21) Appl. No.: 14/790,985

(22) Filed: Jul. 2, 2015

(65) Prior Publication Data

US 2017/0006020 A1    Jan. 5, 2017

(51) Int. Cl.
*H04L 29/06* (2006.01)
*G06F 9/445* (2018.01)
*G06F 8/61* (2018.01)

(52) U.S. Cl.
CPC ............ *H04L 63/0815* (2013.01); *G06F 8/61* (2013.01); *H04L 63/0838* (2013.01)

(58) Field of Classification Search
CPC ...... H04L 63/0815; H04L 63/083; G06F 8/61
USPC ........................................................... 726/6
See application file for complete search history.

(56) References Cited

U.S. PATENT DOCUMENTS

| | | | | |
|---|---|---|---|---|
| 7,478,434 B1 * | 1/2009 | Hinton | ................ | G06F 17/3089 726/27 |
| 8,261,365 B2 * | 9/2012 | Ksontini | ............. | H04L 63/0853 726/29 |
| 8,302,170 B2 * | 10/2012 | Kramer | ................... | H04L 9/002 726/5 |
| 8,646,060 B1 * | 2/2014 | Ben Ayed | ........... | H04L 63/0853 726/9 |
| 8,650,625 B2 * | 2/2014 | Grandcolas | ........... | H04L 9/0825 726/5 |
| 8,752,146 B1 * | 6/2014 | van Dijk | ............. | H04L 63/0861 340/5.52 |
| 9,002,750 B1 * | 4/2015 | Chu | ..................... | H04L 63/0838 705/55 |
| 9,148,285 B2 * | 9/2015 | Chang | ................... | H04L 9/3213 |
| 2002/0184149 A1 * | 12/2002 | Jones | ................... | G06Q 20/105 705/41 |
| 2003/0041263 A1 * | 2/2003 | Devine | ............... | G06F 11/0709 726/4 |

(Continued)

*Primary Examiner* — Jahangir Kabir
(74) *Attorney, Agent, or Firm* — Finch & Maloney PLLC

(57) ABSTRACT

Techniques are disclosed for accessing computing resources using secure single sign on authentication with a single use access token, including website-to-desktop application delivery and secure transfer of context information from the website to the desktop application once valid security credentials are provided from the same end-user computing device. A user signs onto a web application once using the security credentials. A web-based single use token generator generates a single use access token based on the user-supplied security credentials. A web-based context embedder service dynamically generates a context carrier and transfer application including the single use access token. The context carrier and transfer application is provided to an end-user computing device, which, when executed locally, installs a desktop application onto the end-user computing device. The desktop application utilizes the single use access token to access a secure, cloud-based computing resource. The single use access token expires after one use.

12 Claims, 9 Drawing Sheets

(56) References Cited

U.S. PATENT DOCUMENTS

| | | | | |
|---|---|---|---|---|
| 2005/0044197 A1* | 2/2005 | Lai | .................. | G06Q 10/10 709/223 |
| 2005/0160104 A1* | 7/2005 | Meera | .................. | G06F 8/20 |
| 2005/0204405 A1* | 9/2005 | Wormington | .................. | G06Q 30/02 726/27 |
| 2007/0067833 A1* | 3/2007 | Colnot | .................. | H04L 9/3271 726/9 |
| 2007/0171921 A1* | 7/2007 | Wookey | .................. | G06F 3/1415 370/401 |
| 2007/0180493 A1* | 8/2007 | Croft | .................. | G06F 3/1415 726/2 |
| 2009/0064284 A1* | 3/2009 | Poston | .................. | G06F 21/10 726/4 |
| 2010/0077216 A1* | 3/2010 | Kramer | .................. | H04L 9/002 713/172 |
| 2010/0211796 A1* | 8/2010 | Gailey | .................. | G06F 21/31 713/182 |
| 2010/0313032 A1* | 12/2010 | Oswalt | .................. | H04L 63/123 713/176 |
| 2011/0103586 A1* | 5/2011 | Nobre | .................. | H04L 63/0853 380/270 |
| 2011/0126002 A1* | 5/2011 | Fu | .................. | H04L 63/0823 713/156 |
| 2011/0173251 A1* | 7/2011 | Sandhu | .................. | G06F 8/61 709/203 |
| 2011/0173684 A1* | 7/2011 | Hurry | .................. | G06F 21/33 726/6 |
| 2011/0197266 A1* | 8/2011 | Chu | .................. | H04L 9/3228 726/5 |
| 2012/0036507 A1* | 2/2012 | Jonnala | .................. | G06Q 30/02 717/178 |
| 2013/0125226 A1* | 5/2013 | Shah | .................. | H04L 63/0815 726/7 |
| 2013/0139271 A1* | 5/2013 | Arrelid | .................. | G06F 21/10 726/27 |
| 2013/0312079 A1* | 11/2013 | McCallum | .................. | H04L 63/0823 726/10 |
| 2014/0068702 A1* | 3/2014 | Hyndman | .................. | G06F 21/41 726/1 |
| 2014/0082715 A1* | 3/2014 | Grajek | .................. | H04L 63/083 726/8 |
| 2014/0115680 A1* | 4/2014 | Sugiyama | .................. | G06F 21/31 726/7 |
| 2015/0058191 A1* | 2/2015 | Khan | .................. | G06Q 20/42 705/35 |
| 2015/0127547 A1* | 5/2015 | Powell | .................. | G06Q 20/382 705/67 |
| 2015/0180849 A1* | 6/2015 | Nesic | .................. | H04L 63/0815 726/6 |
| 2015/0244706 A1* | 8/2015 | Grajek | .................. | H04L 63/0815 726/6 |
| 2015/0281225 A1* | 10/2015 | Schoen | .................. | H04L 63/06 726/9 |
| 2015/0312038 A1* | 10/2015 | Palanisamy | .................. | H04L 9/3213 713/155 |
| 2016/0012465 A1* | 1/2016 | Sharp | .................. | G06Q 20/18 705/14.17 |
| 2016/0173478 A1* | 6/2016 | Grigg | .................. | G06F 21/31 726/7 |
| 2016/0255075 A1* | 9/2016 | Jiang | .................. | H04L 63/0815 726/6 |

* cited by examiner

AUTHENTICATION CONTEXT TRANSFER FOR ACCESSING COMPUTING RESOURCES VIA SINGLE SIGN-ON WITH SINGLE USE ACCESS TOKENS

FIELD OF THE DISCLOSURE

This disclosure relates to the field of distributed computing, and more particularly, to techniques for accessing computing resources using secure single sign-on authentication with a dynamically generated single use access token.

BACKGROUND

Increasingly, computing resources are migrating from personal computing devices to remotely hosted computing systems, which is referred to as cloud computing. Cloud computing resources include software applications, data storage, and other services, each of which are accessible from an end-user computing device or so-called client via a communications network, such as the Internet. Types of cloud computing resources include, for example, software as a service (SaaS), infrastructure as a service (IaaS), platform as a service (PaaS), desktop as a service (DaaS), backend as a service (BaaS), and information technology management as a service (ITMaaS). Users of cloud computing resources can benefit from an apparently seamless integration of different products and services that are accessible from practically any networked device. However, despite the appearance of integrated resources, there may be instances where, for technical or other reasons, the user must present security credentials (sign on) multiple times to access the various underlying cloud computing resources. For example, an individual user who wishes to perform a task using both a website, via a web browser executing on an end-user device, and related cloud-based services, via a desktop application also executing on the end-user device, may need to sign on by entering the same security credentials twice: once to access the website from the browser, and once to access the cloud-based services from the desktop application. This may occur, for example, when the website is not configured to pass contextual information, including security credentials, to the desktop application (e.g., when the browser and desktop application run in different security sandboxes and cannot access each other's resources), or when the desktop application is not installed on the local device at sign on. Multiple sign-ons are not convenient for the user, particularly when they occur each time the user wishes to perform the same or similar tasks over subsequent sessions. For instance, on a given day, the user may need to sign on twice at work using one computer, and again two more times upon arriving at home using another computer, to perform tasks with the same cloud computing resource.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
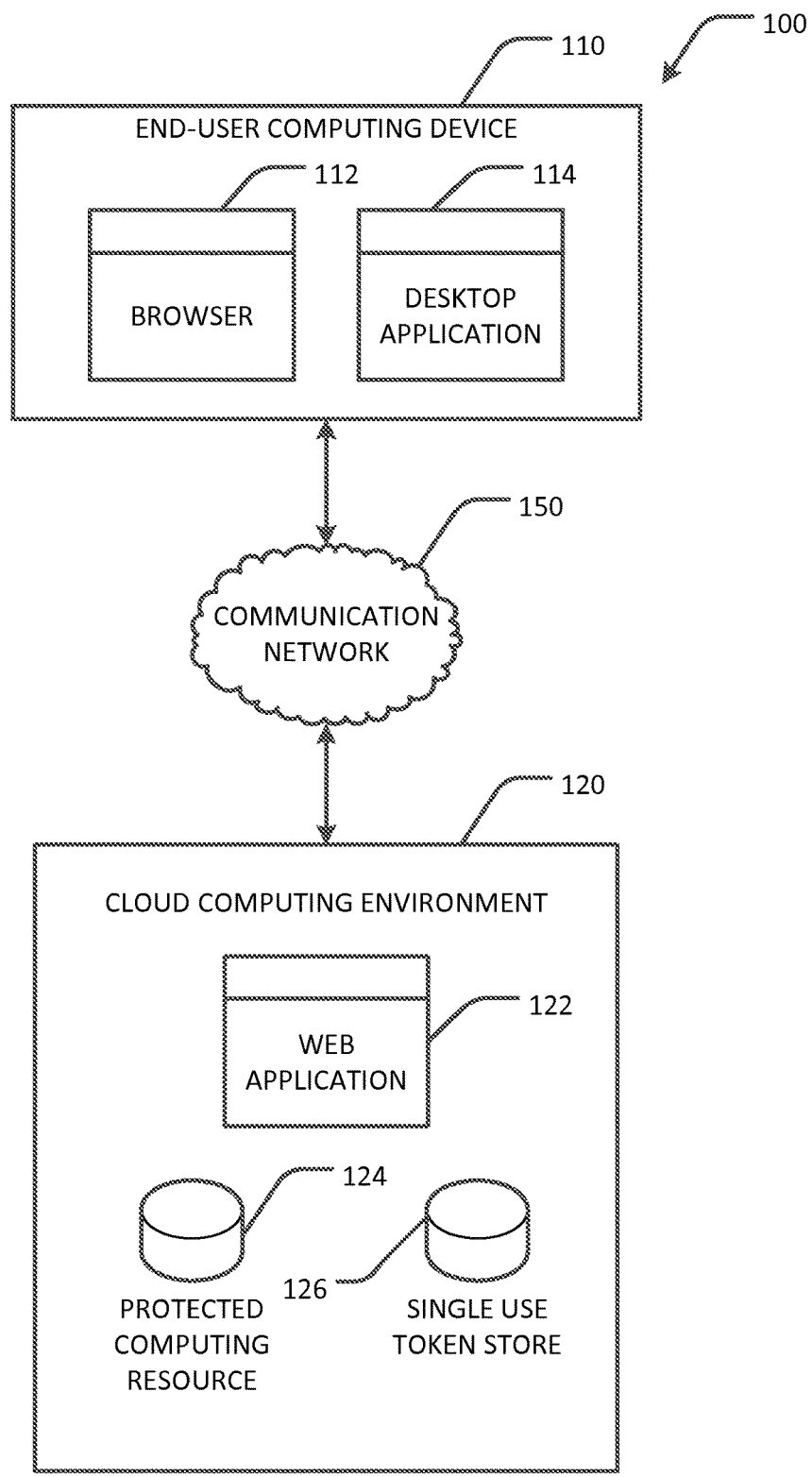
FIG. 1 shows an example system for accessing computing resources using secure single sign-on authentication, in accordance with an embodiment of the present disclosure.

Single sign-on (SSO) is an access control technique for multiple, but independent, software systems. Using SSO, a user can provide a set of valid security credentials one time to gain access to all of the systems. However, existing SSO solutions do not support certain scenarios, including single sign on from a web-based application or website (via, for example, a browser) to a desktop application, with an adequate degree of security or reliability. Some existing SSO solutions, for instance, utilize session cookies, application plug-in software, or browser extensions to share security credentials between web and desktop applications. However, these solutions are unreliable, insecure, and may require advance configuration. Cookie-based systems, for instance, depend on user preferences, security settings, browser implementation, and other factors, each of which are not secure, not generic, and can vary in functionality from one browser to another. Current application-based systems are also not considered secure, and depend on the availability of a given application. Furthermore, plug-ins and browser extensions that effectively provide SSO must be installed prior to passing context information from the web application to the desktop application, which defeats the purpose of SSO in cases where the desktop application is not installed locally at the time of sign on. As such, there is a need for improved SSO techniques that address these and other limitations.

To this end, and in accordance with an embodiment of the present disclosure, techniques are disclosed for accessing computing resources using secure single sign-on (SSO) authentication with a single use access token. The SSO authentication provides broad access to remote resources, including website-to-desktop application delivery and secure transfer of context information from the website to the desktop application, once valid security credentials are provided from the end-user computing device. Thus, an individual user who wishes to perform a task using both a website, via a web browser executing on an end-user device, and related cloud-based services, via a desktop application also executing on the end-user device, is only prompted to sign on by entering security credentials to access the website from the browser, which in turn also provides access to the cloud-based services from the desktop application. To this end, the user need not be prompted a second time to enter security credentials to access the cloud-based services from the desktop application, during a given session. As used in this disclosure, the term "session" refers to a semi-permanent interactive exchange of information between two or more applications or computing devices. A session begins when the user enters security credentials via a web browser, and persists until the user signs off or until another event occurs that causes the session to terminate (e.g., termination of the application(s) that participate in the session, timeout due to session inactivity, disconnection or loss of a network connection, or any other event that is defined as a session-terminating event). For example, a session may begin when the user signs into the website and ends when the user signs out of the website or the cloud-based services. The system can be implemented at the server side and can provide security checks at various points to ensure a seamless and secure SSO experience.

In an example use case, a user signs onto a web application running in a browser using security credentials, by way of a given end-user computing device. The web application is effectively the front-end of a cloud-based service or website and at least indirectly provides access to one or more protected cloud-based computing resources available on one or more server computing systems configured to receive and process requests to access the cloud-based service/website. In one such embodiment, a single use token generator dynamically generates a single use access token based on the received security credentials. A context embedder service then dynamically generates a context carrier and transfer application, which includes the single use access token. The context carrier and transfer application is then provided to the requesting end-user computing device, which, when executed locally on the end-user computing device, installs a desktop application, along with the single use access token, onto the end-user computing device. The desktop application utilizes the single use access token to access at least one of the protected, cloud-based computing resources without prompting the user to reenter the security credentials.

The single use access token expires after one use, in accordance with an embodiment. In this manner, the user need only enter the security credentials one time per session (e.g., to sign onto the website), while being able to download and execute the desktop application so as to further provide access to one or more cloud-based applications of interest without having to sign on a second or subsequent time during the same session. Applications of the disclosed techniques include, for example, the use of subscription-based services with single sign-on capability in conjunction with SaaS products (e.g., incorporating a subscription-based font library into an online document edited via a cloud-based word processor), and the use of messaging, mail and chat services associated with social networking and other content-based websites. Numerous configurations and variations will be apparent in light of this disclosure.

As used in this disclosure, a "web application" refers to an application used to access a given website, and may include various user interface features, such as a login page that prompts a user to enter security credentials. The web application may execute, for example, in a browser or any other appropriate execution environment, and the website may be public (accessible via the Internet) or private (accessible via a private local area network or wide area network).

As used in this disclosure, the term "security credential" refers to information that uniquely represents the identity of a user or group of users, or the authority of such users to access a protected computing resource. Security credentials can include, but are not limited to, username and password combinations, pass phrases or pass codes, personal identification numbers (PINs), challenge-response-type questions and answers, access tokens, hardware tokens, software tokens, digital certificates, biometric information (e.g., fingerprints, retinas, DNA, voice, face, etc.), barcodes, radio frequency identifiers, or any other mechanism suitable for conveying information that can be used to authenticate the identity or authority of a user.

As used in this disclosure, the term "authenticate" refers to a process by which subjects (e.g., users) establish their identity or authority to a computing device or system. Authentication may, for example, be effected by the use of a security credential or other identifying information that normally is known or held only by genuine, authorized individuals. In some cases, authentication can be performed by a security authority or identity provider designated for such purposes.

As used in this disclosure, the term "single use access token" refers to a data object that represents the right of a user to perform an access-controlled operation on a protected computing resource, or a set of such operations. Such a token is considered "single use" because the token can only be used, at most, one time to validate the user. For instance, a single use access token can be utilized by an application or other process to validate, one time only, the right of the user to perform certain operation(s), such as accessing secure data or accessing the functionality of a subscription-based software service. Once the single use access token has been so utilized, the token automatically expires and cannot be used again for such purposes. In some cases, a single use access token is transient and can expire before it is utilized, for example, after a certain amount of time has elapsed since the token was generated or issued by a security authority or identity provider.

As used in this disclosure, the term "validate" refers to a process of checking that an object, such as a single use access token, is suitable for its intended purpose. Examples of such checks include verifying that the object is well-formed (e.g., properly formatted, valid, not tampered with, conforms to an established standard), is issued by a trusted authority (e.g., based on the identity of the token issuer), is intended for use by a particular application, or performing any other checks that may be appropriate for ensuring that the object meets or exceeds certain pre-defined criteria.

As used in this disclosure, the term "install" refers to a process of placing software into a location from where a processor can retrieve the software for execution. In general, software can be distributed in a packaged form (e.g., an installer program) from which executable code is extracted during the installation process and stored on a computer-readable medium, such as a hard drive, flash drive, or other suitable storage location. In some cases, the installation process is a straight copy of software from one location to another. In some other cases, the installation process includes unpacking compressed files and data, verifying the integrity of the software or other data (e.g., using a digital signature, checksum, or other verification technique), configuring the software to suit its environment, registering various software components with the operating system, prompting a user to choose which components are installed, prompting the user to select certain options, or any combination of these.

Techniques for accessing computing resources using secure single sign-on (SSO) authentication with a single use access token, in accordance with various embodiments, provide several advantages. For instance, one such technique includes web-to-desktop application delivery and context passing (e.g., security credential passing) from the web application to the desktop application using SSO. Since the context is embedded in the web-to-desktop application delivery, less secure context passing techniques, such as session cookies, flash storage or browser-based plug-ins, are not needed or used. Furthermore, the disclosed delivery and context passing techniques enable web-to-desktop SSO even when the desktop application is executing in a different security sandbox than the web application, and also when the desktop application is not installed on the local device at sign on to the web application, because the security credentials for SSO are transferred from the web application to the desktop application in the form of a single use access token, which is embedded in the context carrier and transfer application.

An example workflow incorporating techniques for accessing computing resources using secure single sign-on (SSO) authentication with a single use access token, in accordance with various embodiments, is as follows. A user, who is a creative professional, subscribes to a graphics design service, which includes the Adobe Photoshop graphics editor. The Photoshop application is a cloud-based service that includes a desktop application component (e.g., software that executes locally on a desktop computer) for interfacing with the cloud-based Photoshop services. To access the Photoshop application, the user initially logs into a portal website using security credentials (e.g., a username and password) assigned to the user. Next, the user downloads an installer program from the website using a web browser, such as Chrome. The installer program is configured to install the desktop application component locally onto the desktop computer. The desktop application component includes a single use access token. The desktop application submits the single use access token to a security authority. In turn, the security authority permits the desktop application component to access the Photoshop application in the cloud, and perform other functions, without requiring the user to log in again or otherwise enter the security credentials a second time. The user can log out of the service when the user is done. The next time the user wishes to use the Photoshop application, the user again logs into the website and downloads the installer program, such as described above.

Example System

Figure 2:
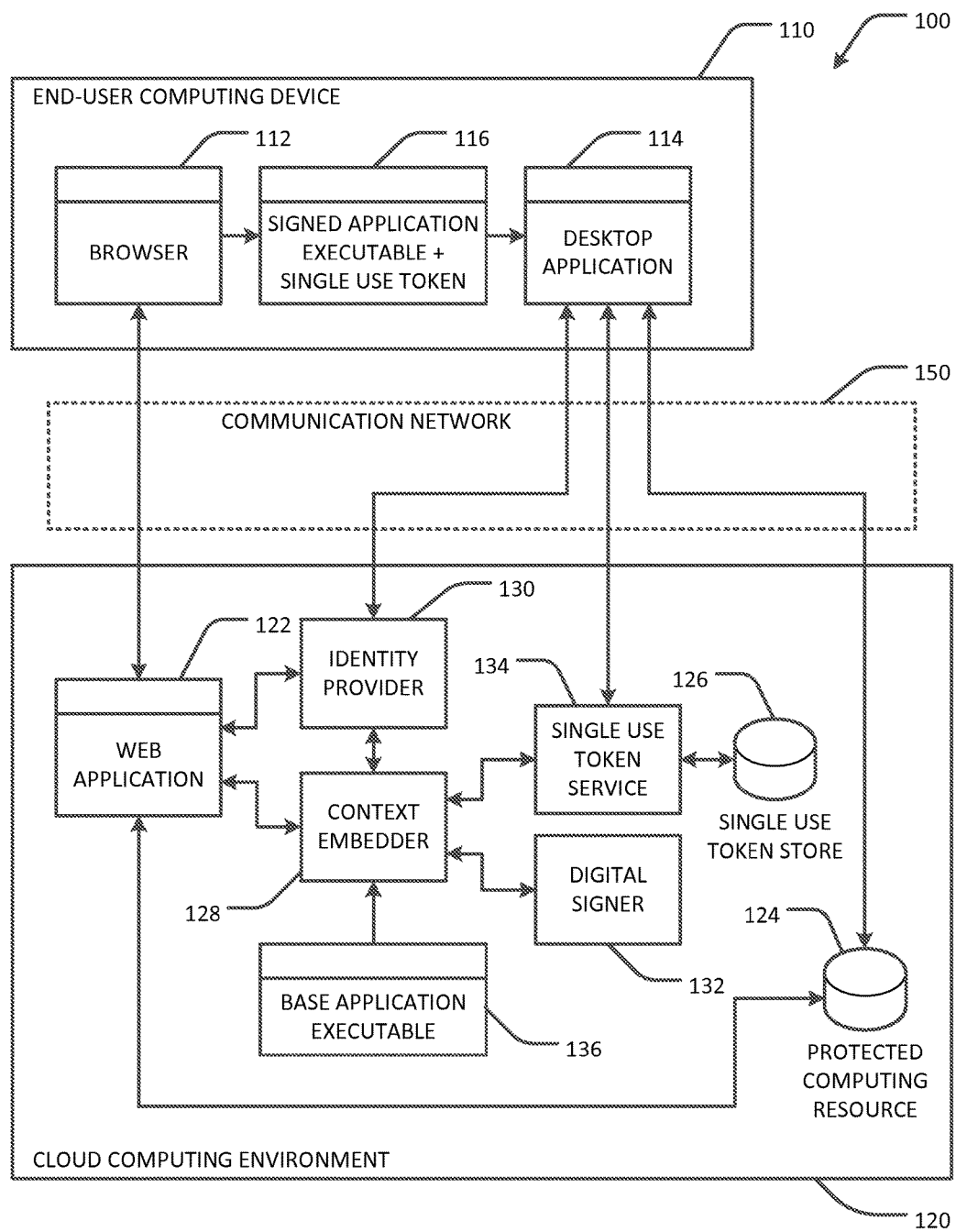
FIG. 2 shows the example system of FIG. 1 in further detail, in accordance with an embodiment of the present disclosure.

FIG. 1 shows an example system 100 for accessing computing resources using secure single sign-on authentication, in accordance with an embodiment of the present disclosure. The system 100 includes one or more end-user computing devices 110, a cloud computing environment 120, and a communication network 150. Each end-user computing device 110 can include a browser 112, a desktop application 114, or both. The desktop application 114 is not necessarily present or persistent on the end-user computing device 110. For example, such as described in further detail with respect to FIGS. 2 and 3, the desktop application 114 may be downloaded via the browser 112 and subsequently installed on the end-user device 110 using an installer program or other executable code. The browser 112, when executed, provides access to a web application 122 residing in, or executed by, the cloud computing environment 120. The web application 122, when executed, performs various functions, such as authenticating user-provided security credentials, as well as providing access from the end-user computing device 110 to a protected computing resource 124 and other components (such as described with respect to FIG. 2) residing in the cloud computing environment 120. In general, the web application 122 can only access the protected computing resource 124 when the end-user computing device 110 presents valid security credentials for the protected computing resource 124 to the web application 122. Further, these security credentials are used by certain other components of the cloud computing environment 120. The security credentials may include, for example, a username and password combination, or an access token generated by a trusted security authority or identity provider (such as shown in FIG. 2). In some cases, as described in further detail with respect to FIG. 3, the access token is only valid for a single use; that is, the so-called single use access token expires after it is presented. The cloud computing environment 120 maintains a copy of the single use access token in a single use token store 126 or database.

The desktop application 114, when executed, also provides access from the end-user computing device 110 to the protected computing resource 124, although the functions performed by the desktop application 114 are not necessarily the same as the functions performed by the web application 122. In some cases, the web application 122 uploads executable binary code representing the desktop application 114 to the end-user computing device 110 via the browser 112. Meanwhile, the desktop application 114, when executed by the end-user computing device 110, performs other functions that utilize the protected computing resource 124 in the cloud computing environment 120. The desktop application 114 may, for example, provide SaaS access to a collection of software for graphic design, video editing, web development, photography, or access to other cloud-based services (e.g., IaaS, TaaS, DaaS, BaaS, or ITMaaS).

The end-user computing device 110 can, at various times, install, activate or execute the browser 112, the desktop application 114, or components of these (e.g., extensions, plug-ins, data). However, the desktop application 114 is not necessarily present or active on the end-user computing device 114 at all times. For example, as described in further detail with respect to FIG. 3, binary code representing the desktop application 114 may be downloaded from the cloud computing environment 120 to the end-user computing device 110 via the browser 112 and the communication network 150. This binary code can include a single use (one-time expiring or OTX) access token, which enables the desktop application 114 to access the protected computing resource 124 residing in the cloud computing environment 120. Subsequently, the end-user computing device 110 can execute the binary code locally, which causes the end-user computing device 110 to perform certain functions, including functions that access or otherwise utilize the protected computing resource 124. After performing those functions, the end-user computing device 110 may, for example, deactivate, remove, or otherwise discontinue execution of the desktop application 114.

FIG. 2 shows the example system 100 of FIG. 1 in further detail, in accordance with an embodiment of the present disclosure. In addition to the browser 112 and the desktop application 114, the end-user computing device 110 can, at various times, include a signed application executable with a single use access token 116 encoded or embedded therein. The executable 116 is binary code that includes a digital signature. When executed by the end-user computing device 110, the executable 116 does one or more of the following: checks the validity of the digital signature (if one is present), downloads the desktop application 114 from the cloud computing environment 120, installs the desktop application 114 on the end-user computing device 110, and invokes execution of the desktop application 114. The incorporation of the single use access token into the executable 116 enables, among other things, the desktop application 114 to utilize security credentials and other context information without prompting the user to sign on if the user has previously provided a valid security credential (e.g., username and password, or other suitable identifying information) via the browser 112.

In addition to the web application 122, the protected computing resource 124, and the single use token store 126, the cloud computing environment 120 includes a context embedder module 128, an identity provider (IdP) module 130, a digital signer module 132, a single use token service module 134, and a base application executable 136. The identity provider 130 provides identifiers for a user seeking to access and interact with the protected computing resource 124, and further asserts that the identifier is valid for such a purpose. The identity provider 130 may, for example, authenticate user-provided security credentials (e.g., username and password) and, if the credentials are valid, generate an access token that can be subsequently accepted as an alternative to explicitly authenticating the user's security credentials. For example, using single sign-on, a user may obtain an access token that the identity provider 130 then validates for each protected computing resource 124 that the user subsequently seeks to access, in lieu of explicitly authenticating the security credentials. The digital signer 132 generates digital signatures, which demonstrate the authenticity of data (e.g., using RSA cryptography). The base application executable 136 is binary code that is similar to the executable 116, but does not include a single use access token and generally is not executed in this state. The functionality of the context embedder 128 and the single use token service 136 are described in further detail with respect to FIG. 3. Further, an example of the use and operation of the system 100 is also described with respect to FIG. 3.

Example Methodology

Figure 3:
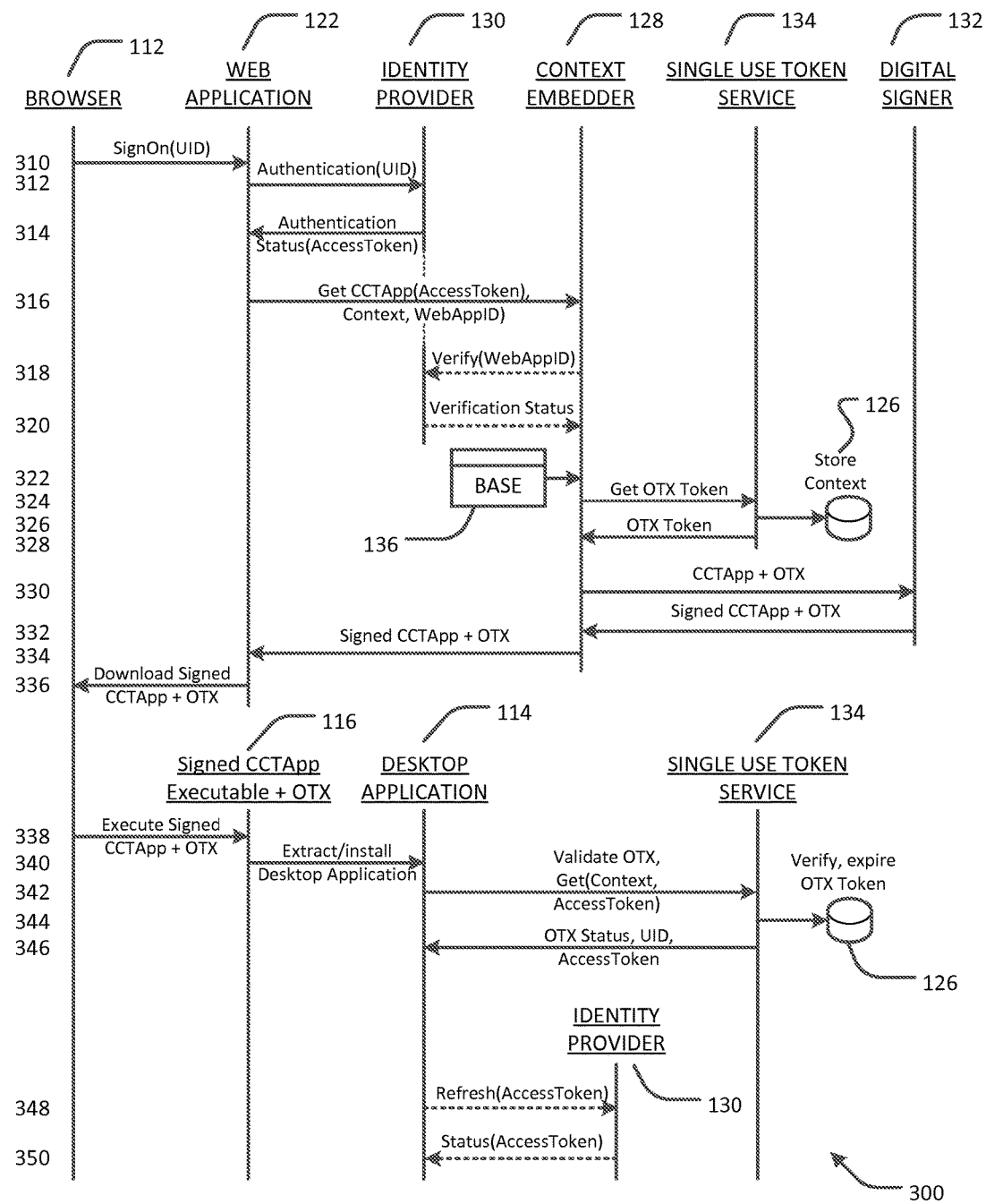
FIG. 3 is a data flow diagram of an example methodology for accessing computing resources using secure single sign-on authentication, in accordance with an embodiment of the present disclosure.

FIG. 3 is a data flow diagram of an example methodology 300 for accessing computing resources using secure single sign-on authentication, in accordance with an embodiment of the present disclosure. The methodology 300 can be implemented by various components of the system 100 of FIGS. 1 and 2, as indicated in FIG. 3 by vertical lines representing those components. Various data elements utilized in the methodology 300 are represented by horizontal arrows, which indicate the flow of data from one component to another, and are numerically referenced along the left side of the diagram. These data elements are shown in an example time-wise progression from the top of the diagram to the bottom, although such ordering is not intended to limit the scope of every embodiment. For example, in some embodiments, some data elements may be optional (as indicated with broken lines), or the sequence in which the data flow occurs may be altered from what is shown without departing from the scope of the various embodiments.

In this methodology 300, a user signs on to the web application 122 by providing 310 security credentials via the browser 112. The user sign on instantiates a user session, which persists until the user signs off or until another event occurs that causes the session to terminate. The security credentials may include, for example, a username and password combination, also referred to in this disclosure as a user id (UID). In turn, the web application 122 authenticates the security credentials by requesting 312 authentication of the UID from the identity provider 130 using, for example, OAuth (open authorization standard) or another suitable protocol. If valid, the identity provider 130 returns an access token (AccessToken) for the user to the web application 122. Note that the AccessToken is not necessarily the same as the single use access token (OTX) described below. Rather, the AccessToken may, for example, be a reusable SSO token. Next, the web application 122 sends 316 the access token (AccessToken) and any other context metadata for the user session to the context embedder 128.

In response to receiving the access token and context metadata from the web application 122, in some cases the context embedder 128 verifies 318 the access token with the identity provider 130, which responds by providing 320 a verification status to the context embedder 128. Next, the context embedder 128 retrieves or generates 322 the base application executable 136. The context embedder 128 requests 324 a single use, or OTX (one-time expiring) token from the single use token service 134 using the context metadata. In response, the single use token service 134 parses the context metadata and generates the OTX token using a suitable hashing algorithm (e.g., MD5, SHA-2 or other suitable hashing algorithm). The OTX token is valid for one use during the current user session. The single use token service 134 also stores 326 the context metadata in the single use token store 126 for future reference. The context metadata is stored against the OTX token, which act as a key value pair. The OTX token can have one or more of the following properties: the OTX token can have a limited validity period of n seconds (e.g., 30 seconds); the OTX token can automatically expire after n seconds; and the OTX token can be used only once, after which the OTX token is marked as used. The single use token service 134 then returns 328 the OTX token to the context embedder 128. In turn, the context embedder 128 encodes the OTX token into the application executable 136, thereby generating the application executable with single use access token 116. The context embedder 128 sends 330 the application executable with single use access token 116 to the digital signer 132, which digitally signs the application executable with single use access token 116 using, for example, a standard signature service. The digital signer 132 returns 332 the digitally signed executable 116 to the context embedder 128, which in turn sends the digitally signed executable 116 to the web application 122. From the browser 112, the user can then download 336 the digitally signed executable 116 to the end-user computing device 110 from the web application 122. The browser 112 can, in some cases, cross-check the digital signature of the digitally signed executable 116 as an additional security measure.

Once downloaded, the end-user computing device 110 can execute 338 the digitally signed executable 116. Upon execution, the executable 116 checks the validity of the digital signature, if a digital signature is present. If the digital signature is valid, the executable 116 extracts and installs 340 the desktop application 114 onto the end-user computing device 110, as well as transfer the context metadata, the digital signature, and the OTX token to the desktop application 114.

Upon execution, the desktop application 114 checks the validity of the digital signature, if a digital signature is present. If the digital signature is valid, the desktop application 114 validates 342 the OTX token with the single use token service 134. The single use token service 134 validates 344 the OTX token against the context metadata and OTX token in the single use token store 126, at which point the OTX token and associated context metadata expires. If the OTX token is valid, the single use token service 134 returns 346 a valid token status message to the desktop application 134. In response to receiving the valid token status message, the desktop application 114 does not prompt the user for any security credentials (e.g., username or password) to access the protected computing resource 124. Rather, the OTX token serves as a proxy for the user credentials provided earlier during sign on 310. On the other hand, if the OTX token is not valid, the single use token service 134 returns 346 an error status message to the desktop application 134. In response to receiving the error status message, the desktop application 114 prompts the user to enter the security credentials (e.g., username, password, or both).

Example Methodologies

Figure 4A:
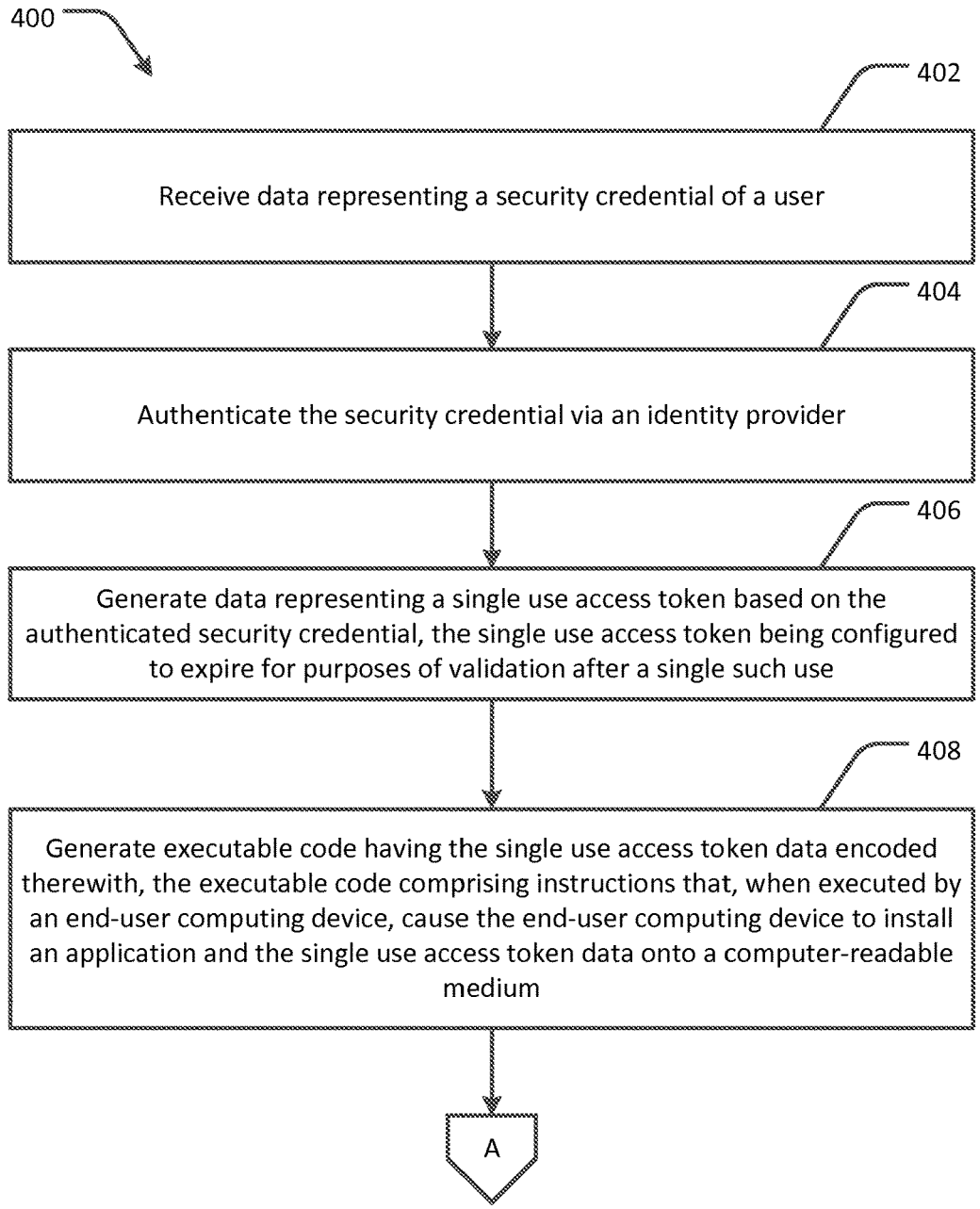
FIGS. 4A and 4B are flow diagrams of an example methodology for accessing computing resources using secure single sign-on authentication, in accordance with an embodiment of the present disclosure.
Figure 4B:
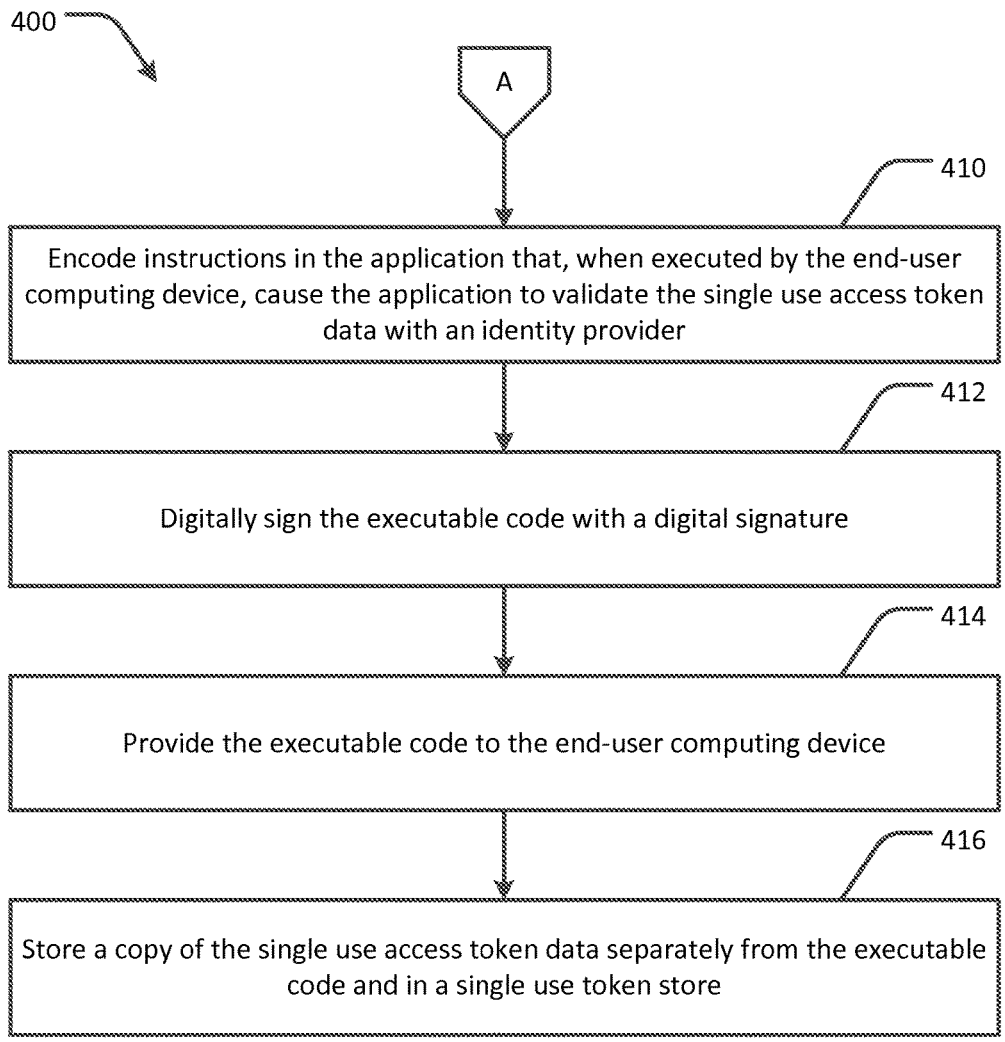

FIGS. 4A and 4B show an example methodology 400 for accessing computing resources using secure single sign-on authentication, in accordance with an embodiment. The methodology 400 may be implemented, for example, by all or portions of the system 100 of FIGS. 1 and 2. Further, the system 100 may perform some or all portions of the methodology 400 in different sequences than those described with respect to FIGS. 4A and 4B. Referring to FIG. 4A, the method 400 includes receiving 402 data representing a security credential of a user. For example, the web application 122 may prompt the user to enter a username and password, or other identifying information, via the browser 112. The method 400 further includes authenticating 404 the security credential via an identity provider or other security authority. For example, the web application 122 may send the security credential to the identity provider 130 for authentication. In turn, the identity provider 130 may authenticate the security credential and return a result (e.g., either authenticated or not authenticated, as the case may be for the given security credential) to the web application 122. If the security credential is authenticated, the method 400 includes generating 406 data representing a single use access token based on the authenticated security credential. The single use access token is configured to expire for purposes of validation after a single such validation, or earlier. For example, the context embedder 128 may send a message, including the authenticated security credential or another representative thereof, to the single use token service 136 requesting generation of the single use access token. In turn, the single use token service 136 may generate the single use access token, return the token to the context embedder 128, and store a copy of the token in the single use token store 126 for future reference. The method 400 further includes generating 408 executable code having the single use access token data encoded with, or embedded in, the executable code. The executable code may be based, for example, on the base application executable 138, which does not have the single use access token encoded or embedded. Further, the context embedder 128 may, for example, generate the executable code and return the executable code with the single use access token data to the web application 122.

Referring to FIG. 4B, in some cases, the method 400 includes encoding 410 instructions in the application that, when executed by the end-user computing device, cause the application to validate the single use access token with an identity provider. In some cases, the method 400 includes digitally signing 412 the executable code with a digital signature. In some cases, the method 400 includes providing 414 the executable code to the end-user computing device. In some cases, the method 400 includes storing 416 a copy of the single use access token data separately from the executable code and in a single use token store for future reference. It will be understood that, in some embodiments, any or all portions of the method 400 can be implemented by various components of the cloud computing environment 120 of FIGS. 1 and 2 in conjunction with one or more end-user computing devices 110.

Figure 5A:
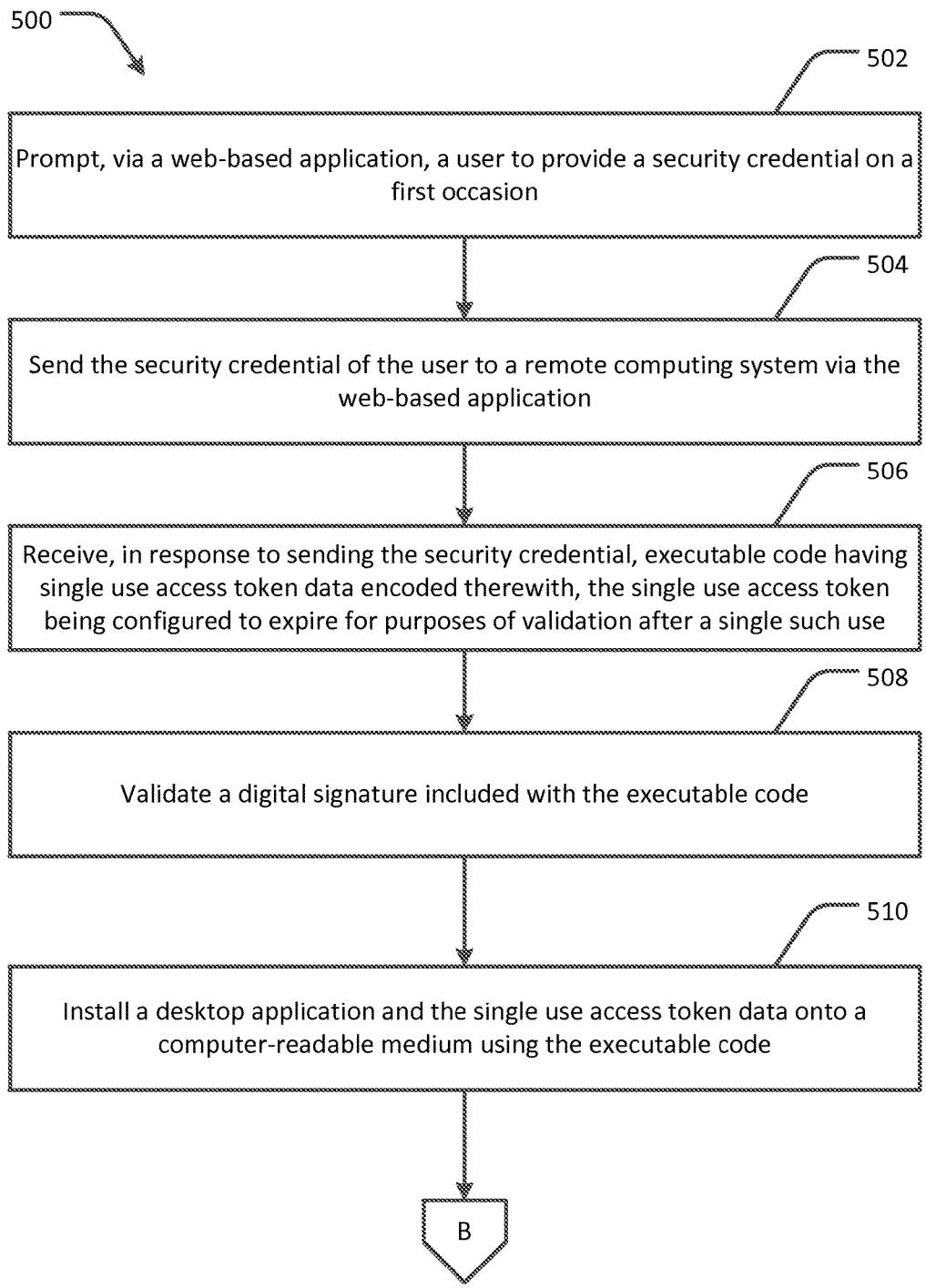
FIGS. 5A and 5B are flow diagrams of another example methodology for accessing computing resources using secure single sign-on authentication, in accordance with an embodiment of the present disclosure.
Figure 5B:
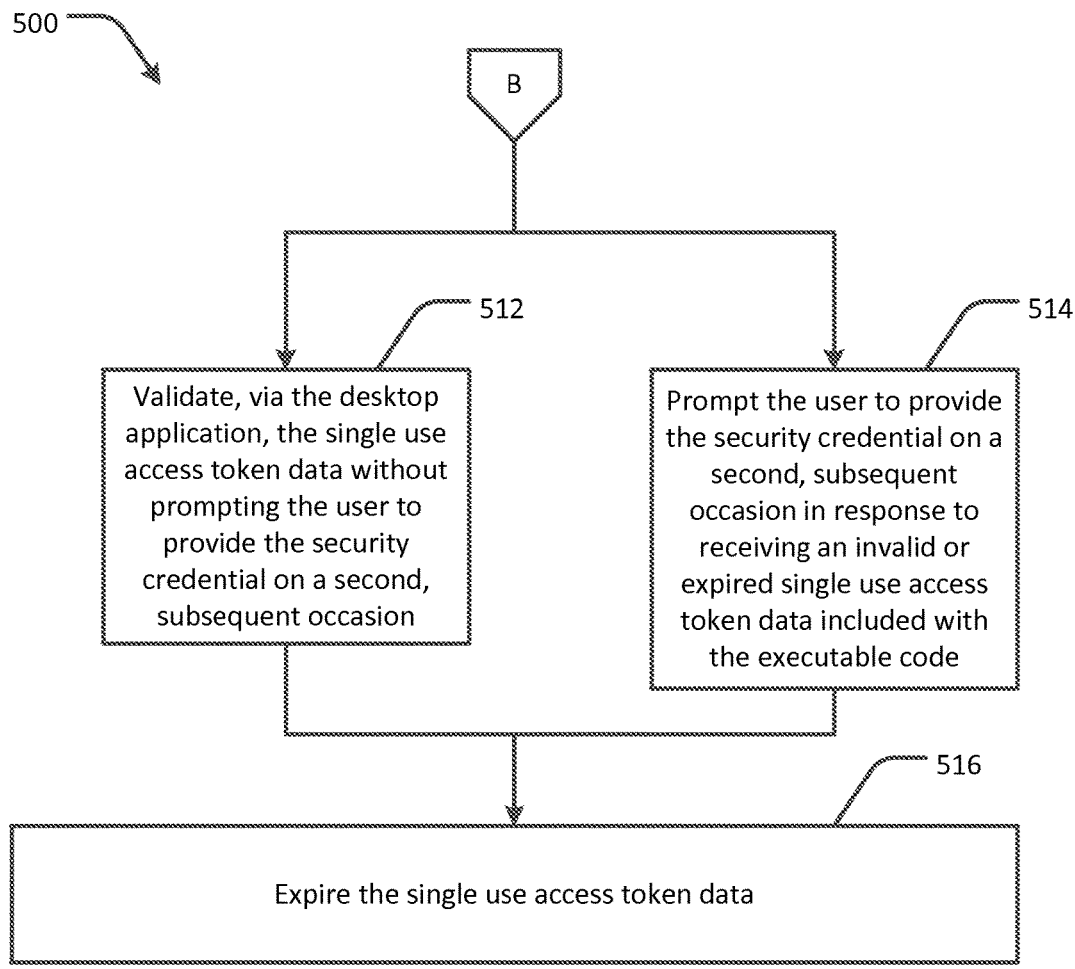

FIGS. 5A and 5B show an example methodology 500 for accessing computing resources using secure single sign-on authentication, in accordance with an embodiment. The methodology 500 may be implemented, for example, by all or portions of the system 100 of FIGS. 1 and 2. Further, the system 100 may perform some or all portions of the methodology 500 in different sequences than those described with respect to FIGS. 5A and 5B. In some embodiments, the cloud computing environment 120 performs some or all portions of the method 400 in conjunction with some or all portions of the method 500, which may be variously performed by one or more of the computing devices 110. Referring to FIG. 5A, the method 500 includes prompting 502 a user to provide a security credential on a first occasion. For example, the web application 122 may prompt the user to provide a username and password or other identifying information via the browser 112. This is sometimes referred to as a sign on or login for a given interactive session between the user and the system 100. The method 500 further includes sending 504 the security credential of the user to a remote computing system via the web application. For example, once obtained, the browser 112, residing in the end-user computing device 110, may send the security credential to the web application 122 residing the cloud computing environment 120 via the communication network 150. In response to sending 504 the security credential, the method 500 includes receiving 506 executable code having single use access token data encoded or embedded therein. For example, the executable code generated in method 400 may be downloaded from the cloud computing environment 120 to the end-user computing device 110 via the web application 122 and the browser 112. In some cases, the method 500 further includes validating 508 a digital signature included with the executable code.

The method 500 further includes installing 510 a desktop application and the single use access token data onto a computer-readable medium using the executable code. For example, the executable code, when executed, may automatically extract the application and single use access token data from the executable code, and store the application and single use access token data in a suitable location on a hard drive or other storage device of the end-user computing device 110. In some cases, the executable code alternatively downloads the application from another source (e.g., a server in the cloud computing environment 120), and then installs the application along with the single use access token data on the end-user computing device 110. In this manner, the single use access token, and any context information associated with the token, is automatically transferred from the cloud computing environment 120 to the end-user computing device 110, which allows the application to access the protected computing resource 124 without requiring the user to present the security credentials on a second occasion during the session. For instance, referring to FIG. 5B, in some cases, the method 500 includes validating 512, via the application, the single use access token with prompting the user to provide the security credential on a second, subsequent occasion. For example, the desktop application 114, when executed, may send the single use access token to the single use token service 136 for validation. In turn, the single use token service 136 may return the validation status of the token to the desktop application 134. A valid token permits the desktop application to access the protected computing resource 124 without prompting the user to reenter his or her username and password (or other identifying information), since this security credential was previously presented by the user above (see references 502 and 504 of FIG. 5A) during the current session. In such cases, the method 500 further includes expiring 516 the single use access token. In some cases, however, if the single use access token is invalid or already expired, the method 500 includes prompting 514 the user to provide the security credential on a second, subsequent occasion. This may occur, for example, if the token has already been used or has otherwise expired due to time or other expiration conditions. In any case, however, the methodology 500 is repeated during the next session, including the prompting 502 of the user to provide the security credential, the receiving 506 of the executable code, and the installing 510 of the desktop application. This is so because the executable code, and the desktop application that is extracted from and installed by the executable code, includes a single use access token that is only valid for the current session. If the same desktop application used during the current session is used again during the next session, the single use access token will be invalid for the next session and the user will be prompted 514 to provide the security credential again. It will be understood that, in some embodiments, any or all portions of the method 500 can be implemented by various components of the one or more end-user computing devices 110 of FIGS. 1 and 2 in conjunction with the cloud computing environment 120.

Example Security Scheme

Figure 6:
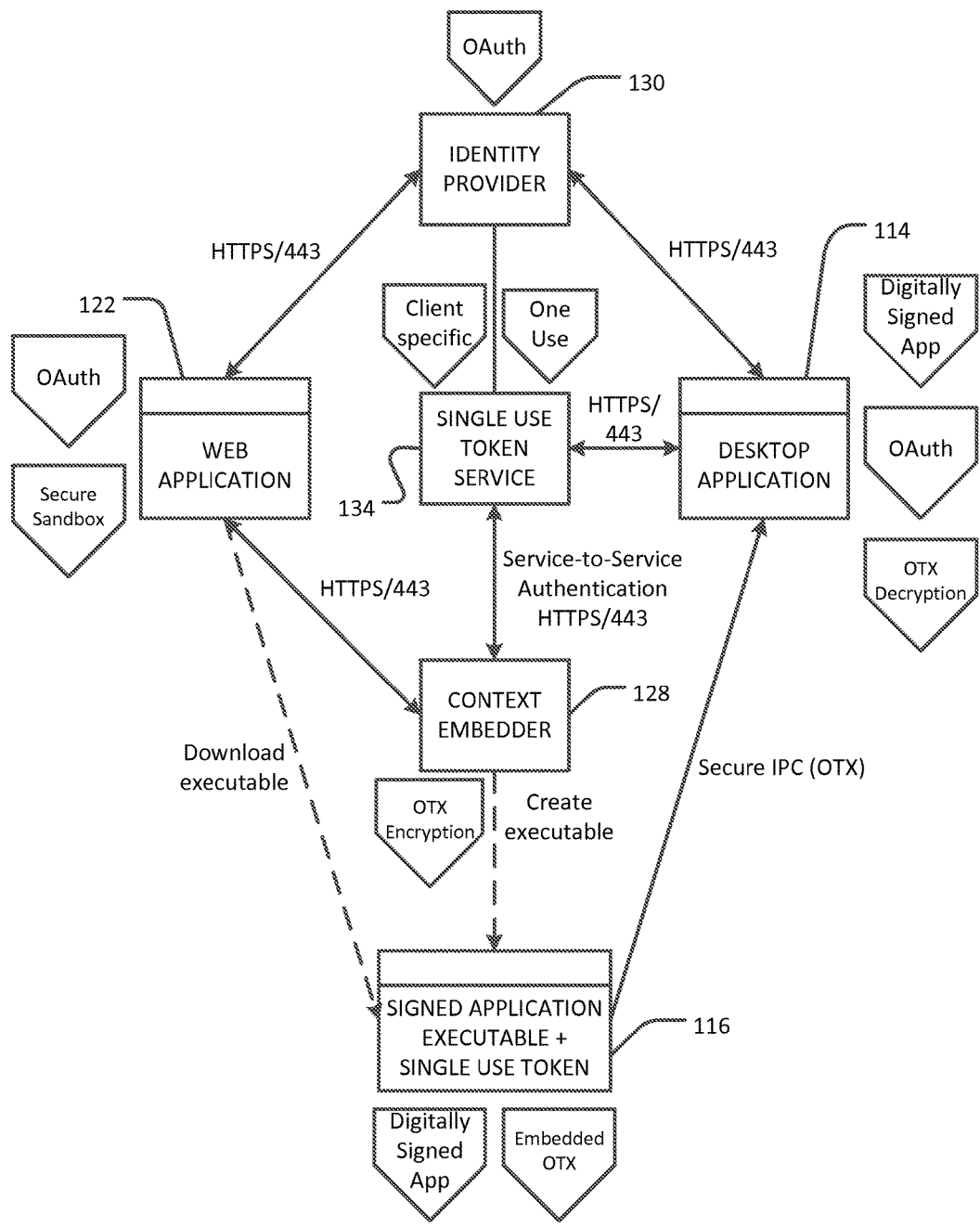
FIG. 6 is a diagrammatic representation of an example security scheme that can be implemented by the system of FIGS. 1 and 2, in accordance with an embodiment of the present disclosure.

FIG. 6 is a diagrammatic representation of an example security scheme that can be implemented by the system 100 of FIGS. 1 and 2, in accordance with an embodiment. In this example scheme, the web application 122 executes via the browser 112 in a so-called sandbox without depending on cookies or local storage for single sign-on or for passing context metadata from the web application 122 to the desktop application 114. This prevents horizontal privilege escalation by an unauthorized application that hijacks or otherwise obtains a session cookie containing privileged data. Also in this example scheme, the web application 122 can be whitelisted (e.g., pre-approved) by the context embedder 128, and the identity provider 130 can independently validate information provided to the context embedder 128 from the web application 122. This provides additional layers of authentication between various components of the system 100.

In this example scheme, the OTX token is based on a hash of a unique session identifier, the context metadata, the access token (AccessToken), and timestamp data. This further limits the scope of possible security attack by limiting the valid time period of the OTX token, automatically expiring the OTX token after a certain period of time, and only permitting a single use of the OTX token. Further, by digitally signing the executable with OTX token 116, the end-user computing device 110 can check that the executable 116 came from a valid and genuine source (e.g., the context embedder 128), further limiting the ability for an unauthorized application to tamper with the OTX token.

In some embodiments, the context embedder 128 encrypts the OTX token before encoding the OTX token and an asymmetric cryptographic key known to the single use token service 136 into the executable 116. Likewise, the desktop application 114 decrypts the OTX token using the key, and the single use token service 136 further requires a decrypted OTX token from the desktop application 114 (e.g., the single use token service 136 may not validate an encrypted OTX token). Furthermore, even if an unauthorized application obtains an encrypted and valid OTX token (e.g., via a man-in-the-middle attack), the OTX token expires after one use, preventing its reuse. In some embodiments, the executable 116 passes the context metadata and OTX token to the desktop application 114 via a secure inter-process communication (IPC) channel implemented by the end-user computing device 110, further limiting access to this information. In some embodiments, the desktop application 114 validates the digital signature prior to accepting the OTX token, further limiting the ability for an unauthorized application to tamper with the OTX token. In some embodiments, the desktop application 114 validates the OTX token with the single use token service 136 via a secure HTTP channel, which limits the ability of an unauthorized application to intercede and modify the OTX token. In some embodiments, the desktop application 114 validates the user's access token (AccessToken) with the identity provider 130 over a secure HTTP channel before completing the sign-on process, which limits the ability of an unauthorized application to intercede and modify the access token. In some embodiments, all communication between the end-user computing device 110 and the cloud computing environment 120 occurs over a secure HTTP channel, which limits the ability of an unauthorized application to intercept and modify the communications. In some embodiments, the end-user computing device 110 executes the executable 116 from an elevated privilege location, such as <ProgramFiles> in a Windows environment or /Applications in a Mac OSX environment, which limits the ability of an unauthorized application to intercede and modify the binary code.

Example Computing Device

Figure 7:
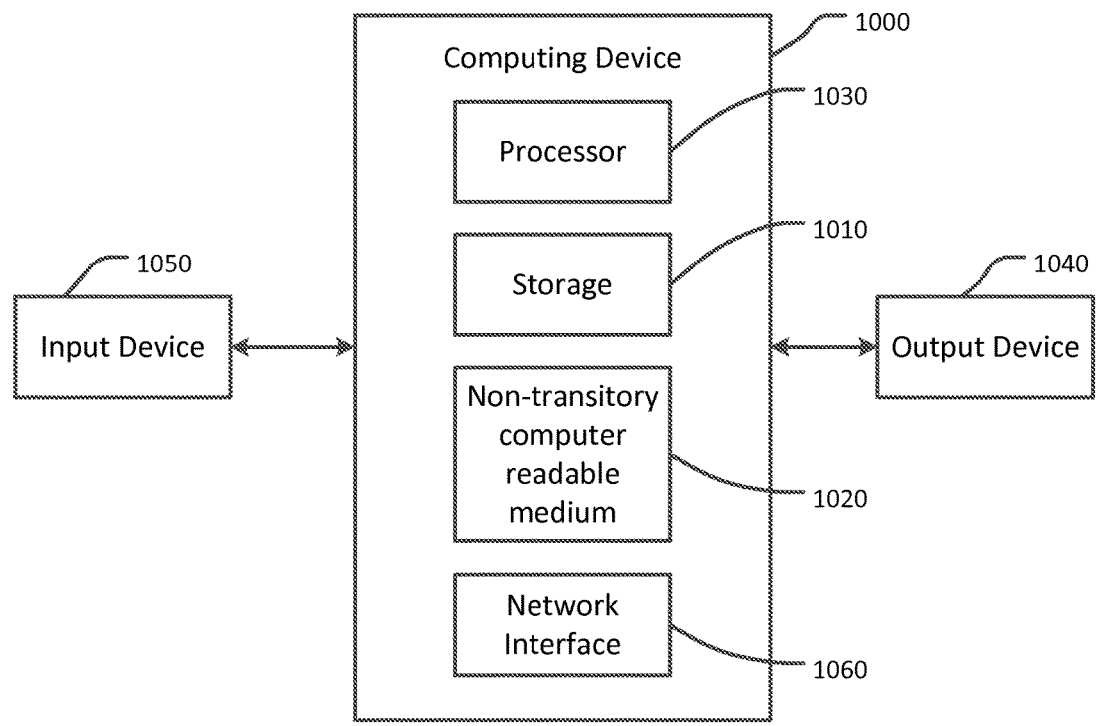
FIG. 7 is a block diagram representing an example computing device that may be used in accordance with an embodiment of the present disclosure.

FIG. 7 is a block diagram representing an example computing device 1000 that may be used to perform any of the techniques as variously described in this disclosure. For example, the system 100 of FIGS. 1 and 2, or any portions thereof, and the methodologies of FIGS. 4A, 4B, 5A and 5B, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the browser 112, the desktop application 114, the web application 122, the protected computing resource 124, the single use token store 126, the context embedder 128, the identity provider 130, the digital signer 132, the single use token service 134, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One embodiment provides a computer-implemented method for accessing computing resources using secure single sign-on authentication. The method includes authenticating, by any of one or more computer processors, data representing a security credential of a user (e.g., a username and password); generating, by any of the one or more computer processors, data representing a single use access token based on the authenticated security credential, the single use access token being configured to expire for purposes of validation after a single such validation occurs against the single use access token; and generating, by any of the one or more computer processors, executable code (e.g., a context carrier and transfer application) having the single use access token data encoded therewith, the executable code including instructions that, when executed by an end-user computing device, cause the end-user computing device to install an application and the single use access token data onto a computer-readable medium. In some cases, the method includes digitally signing, by any of the one or more processors, the executable code with a digital signature. In some cases, the generating of the executable code includes encoding instructions in the application that, when executed by the end-user computing device, cause the application to validate the single use access token data with an identity provider. In some cases, the method includes storing a copy of the single use access token data separately from the executable code and in a single use token store. In some cases, the method includes providing the executable code to the end-user computing device; and in response to a request from the end-user computing device by way of the application, providing the end-user computing device access to a protected computing resource without requiring user entry of security credentials.

Another embodiment provides a computer-implemented method for accessing computing resources using secure single sign-on authentication. The method includes prompting, by a computer processor, a user to provide a security credential (e.g., a username and password) on a first occasion; sending, by the computer processor, the security credential of the user to a remote computing system via a browser; receiving, by the computer processor and in response to sending the security credential, executable code having single use access token data encoded therewith (e.g., a context carrier and transfer application), the single use access token being configured to expire for purposes of validation after a single such validation occurs against the single use access token; and installing, by the computer processor, a desktop application and the single use access token data onto a computer-readable medium using the executable code, the desktop application being different than the browser. In some cases, the method includes validating, by the computer processor and via the desktop application, the single use access token data without prompting the user to provide the security credential on a second, subsequent occasion. In some such cases, the method includes expiring or marking used, by the computer processor, the single use access token data. In some cases, the method includes validating, by the computer processor, a digital signature included with the executable code. In some cases, the method includes prompting the user to provide the security credential on a second, subsequent occasion in response to receiving an invalid or expired single use access token data included with the executable code. In some cases, some or all of the functions variously described in this paragraph can be performed in any order and at any time by one or more different processors.

Another embodiment provides a system having a storage and one or more computer processors operatively coupled to the storage, the one or more computer processors configured to execute instructions stored in the storage that when executed cause any of the one or more computer processors to carry out a process. The process includes receiving data representing a security credential of a user (e.g., a username and password); authenticating the security credential; generating data representing a single use access token based on the authenticated security credential, the single use access token being configured to expire for purposes of validation after a single such validation occurs against the single use access token; and generating executable code having the single use access token data encoded therewith (e.g., a context carrier and transfer application), the executable code comprising instructions that, when executed by an end-user computing device, cause the end-user computing device to install an application and the single use access token data onto a computer-readable medium. In some cases, the process includes providing the executable code to the end-user computing device; and in response to a request from the end-user computing device by way of the application, providing the end-user computing device access to a protected computing resource without requiring user entry of security credentials. In some cases, the process includes digitally signing, by the one or more processors, the executable code with a digital signature. In some cases, the generating of the executable code includes encoding instructions in the application that, when executed by an end-user computing device, cause the application to validate the single use access token data with an identity provider. In some cases, the process includes storing a copy of the single use access token data separately from the executable code and in a single use token store. In some cases, the process includes prompting, via a web application, a user to provide a security credential (e.g., a username and password) on a first occasion; authenticating the security credential of the user via the web application; receiving, in response to authentication of the security credential, the executable code having single use access token data encoded therewith (e.g., a context carrier and transfer application); and installing a desktop application and the single use access token data onto a computer-readable medium using the executable code. In some such cases, the process includes validating, via the desktop application, the single use access token data without prompting the user to provide the security credential on a second, subsequent occasion. In some such cases, the process includes expiring or marking used the single use access token data subsequent to the validating of the single use access token data. In some cases, the process includes prompting the user to provide the security credential on a second, subsequent occasion in response to receiving an invalid or expired single use access token data included with the executable code. In some cases, the process includes validating a digital signature included with the executable code. Yet another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of this disclosure as set forth in the claims.

What is claimed is:

1. A computer-implemented method for accessing computing resources using secure single sign-on authentication, the method comprising:
   authenticating, by any of one or more computer processors, data representing a security credential of a user;
   generating, by any of the one or more computer processors, a single use access token in response to authentication of the security credential of the user, the single use access token being configured to expire for purposes of validation after a single such validation of the security credential of the user occurs against the single use access token by any application utilizing the single use access token, the single use access token including data representing the security credential of the user, wherein to expire includes marking done the single use access token;
   generating, by any of the one or more computer processors, executable code that includes the single use access token therein, wherein the executable code functions to transfer the single use access token; and
   digitally signing, by any of the one or more computer processors, the executable code with a digital signature;
   wherein, the executable code comprises instructions that, when provided onto and executed by a computing device of the user cause the computing device to check the validity of the digital signature included with the executable code and, in response to validating the digital signature included with the executable code, install at least one application that utilizes the single use access token and the single use access token onto a computer-readable medium of the computing device of the user,
      further cause the at least one application to validate the single use access token transferred to the computing device by the executable code with a single use token service, and
      further cause the at least one application to use the validated single use access token as the security credential of the user to access a protected computing resource without requiring entry of the security credential of the user.

2. The method of claim 1, further comprising storing a copy of data representing the single use access token separately from the executable code and in a single use token store.

3. A computer-implemented method for accessing computing resources using secure single sign-on authentication, the method comprising:
   prompting, by a computer processor, a user to provide a security credential on a first occasion;
   sending, by the computer processor, the security credential of the user to a remote computing system via a browser;
   receiving, by the computer processor and in response to authentication of the security credential of the user by the remote computing system, executable code that includes a single use access token therein, the single use access token including data representing the security credential of the user, wherein the executable code is digitally signed with a digital signature, wherein the executable code functions to transfer the single use access token, the single use access token being configured to expire for purposes of validation after a single such validation of the security credential of the user occurs against the single use access token by any application utilizing the single use access token;
   validating, by the computer processor, the digital signature included with the executable code; and
   in response to validating the digital signature included with the executable code,
      installing, by the computer processor as a result of execution of the executable code, a desktop application that utilizes the single use access token and the single use access token onto a computer-readable medium, the desktop application being different than the browser;
      validating, via execution of the desktop application, the single use access token with a single use token service; and
      using, via execution of the desktop application, the validated single use access token as the security credential of the user to access a protected computing resource without requiring entry of the security credentials of the user.

4. The method of claim 3, further comprising validating, by the computer processor and via the desktop application, the single use access token without prompting the user to provide the security credential on a second, subsequent occasion.

5. The method of claim 4, further comprising at least one of expiring and marking done, by the computer processor, the single use access token.

6. The method of claim 3, further comprising prompting the user to provide the security credential on a second, subsequent occasion in response to receiving an invalid or expired single use access token included with the executable code.

7. A system comprising:
   a non-transitory storage; and
   one or more computer processors at least partly implemented in hardware and operatively coupled to the storage, the one or more computer processors configured to execute instructions stored in the storage that when executed cause any of the one or more computer processors to carry out a process comprising:
      receiving data representing a security credential of a user;
      authenticating the security credential of the user;
      generating a single use access token in response to authentication of the security credential of the user, the single use access token being configured to expire for purposes of validation after a single such validation of the security credential of the user occurs against the single use access token by any application utilizing the single use access token, the single use access token including data representing the security credential of the user, wherein to expire includes marking done the single use access token;
      generating executable code that includes the single use access token therein, wherein the executable code functions to transfer the single use access token; and
      digitally signing the executable code with a digital signature;
      wherein the executable code comprises instructions that, when provided onto and executed by a computing device of the user,
         cause the computing device to check the validity of the digital signature included with the executable code and, in response to validating the digital signature included with the executable code, install at least one application that utilizes the single use access token and the single use access token onto a computer-readable medium of the computing device of the user,
         further cause the at least one application to validate the single use access token transferred to the computing device by the executable code with a single use token service, and
         further cause the at least one application to use the validated single use access token as the security credential of the user to access a protected computing resource without requiring entry of the security credential of the user.

8. The system of claim 7, wherein the process further comprises storing a copy of data representing the single use access token separately from the executable code and in a single use token store.

9. The system of claim 7, wherein the process further comprises:
   prompting, via a web application, a user to provide a security credential on a first occasion;
   authenticating the security credential of the user via the web application; and
   generating, in response to authentication of the security credential, the executable code having the single use access token encoded therewith.

10. The system of claim 9, wherein the process further comprises validating, via the application, the single use access token without prompting the user to provide the security credential on a second, subsequent occasion.

11. The system of claim 10, wherein the process further comprises at least one of expiring and marking done the single use access token subsequent to the validating of the single use access token.

12. The system of claim 9, wherein the process further comprises prompting the user to provide the security credential on a second, subsequent occasion in response to receiving an invalid or expired single use access token included with the executable code.

* * * * *